US011816965B2

(12) United States Patent
Hodges

(10) Patent No.: US 11,816,965 B2
(45) Date of Patent: Nov. 14, 2023

(54) CANNABIS TRACKING ASSEMBLY

(71) Applicant: Barrington Hodges, Indianapolis, IN (US)

(72) Inventor: Barrington Hodges, Indianapolis, IN (US)

( * ) Notice: Subject to any disclaimer, the term of this patent is extended or adjusted under 35 U.S.C. 154(b) by 18 days.

(21) Appl. No.: 17/677,497

(22) Filed: Feb. 22, 2022

(65) Prior Publication Data
US 2022/0180713 A1 Jun. 9, 2022

Related U.S. Application Data

(63) Continuation-in-part of application No. 17/109,609, filed on Dec. 2, 2020, now abandoned.

(51) Int. Cl.
*G07G 1/00* (2006.01)
*G07G 1/12* (2006.01)
*G06Q 30/018* (2023.01)

(52) U.S. Cl.
CPC ............ *G07G 1/0081* (2013.01); *G07G 1/12* (2013.01); *G06Q 30/018* (2013.01)

(58) Field of Classification Search
CPC ....... G07G 1/0081; G07G 1/12; G06Q 30/018
See application file for complete search history.

(56) References Cited

U.S. PATENT DOCUMENTS

| 5,424,524 | A | 6/1995 | Ruppert |
| D531,156 | S | 10/2006 | Ahn |
| 9,033,226 | B1 | 5/2015 | Gazdzinski |
| 9,852,393 | B2 * | 12/2017 | Walden ............... G06Q 10/0838 |
| 9,881,290 | B2 | 1/2018 | Edwards |
| 10,503,208 | B2 | 12/2019 | Weldon |
| 10,530,584 | B2 * | 1/2020 | Kovach ................. H04L 9/3239 |
| 2015/0254743 | A1 * | 9/2015 | Dellaportas .......... G06Q 50/265 |
| | | | 705/26.25 |
| 2016/0267250 | A1 * | 9/2016 | Reinheimer ........... G16H 10/60 |
| 2017/0024689 | A1 * | 1/2017 | Dufour .................. H04L 63/062 |
| 2018/0004682 | A1 * | 1/2018 | Kovach ................. H04L 9/3242 |

(Continued)

FOREIGN PATENT DOCUMENTS

WO WO2019152862 8/2019

OTHER PUBLICATIONS

Abelseth, Brian. "Blockchain Tracking and Cannabis Regulation: Developing a permissioned blockchain network to track Canada's cannabis supply chain." Dalhousie Journal of Interdisciplinary Management 14 (2018). (Year: 2018).*

(Continued)

*Primary Examiner* — Nathan A Mitchell

(57) ABSTRACT

A cannabis tracking assembly for tracking the progress of cannabis products through a retail chain includes a tracking unit that can be manipulated by a user in a cannabis retail environment. The tracking unit is actuatable to scan identifying data from cannabis products received from a manufacturer and cannabis products sold to customers. In this way the tracking unit can track the cannabis products throughout the retail distribution chain. Additionally, the tracking unit has point of sale capabilities to process payments received from retail customers of the cannabis products. The tracking unit is in remote communication with a remote data storage device to transfer data to and from the remote data storage device.

13 Claims, 6 Drawing Sheets

(56) References Cited

U.S. PATENT DOCUMENTS

| | | | |
|---|---|---|---|
| 2019/0241982 A1 | 8/2019 | Hogan | |
| 2020/0054245 A1* | 2/2020 | Cooper | A61B 5/6898 |
| 2020/0250740 A1* | 8/2020 | Cooley | G06Q 30/0607 |
| 2020/0265540 A1* | 8/2020 | Ogden | G16H 70/40 |
| 2020/0279211 A1* | 9/2020 | Gillett | G06K 7/1413 |
| 2020/0342434 A1* | 10/2020 | Zomok | G06Q 20/207 |
| 2021/0182820 A1* | 6/2021 | Nieuwborg | G06Q 20/327 |
| 2021/0248621 A1* | 8/2021 | D'Elia | G06Q 30/018 |
| 2021/0406814 A1* | 12/2021 | Alsayar | G06F 16/955 |
| 2022/0092669 A1* | 3/2022 | Abrahamian | G06Q 30/0631 |
| 2022/0129718 A1* | 4/2022 | Roth | A23L 2/52 |
| 2022/0193027 A1* | 6/2022 | Moore | G06Q 30/0208 |
| 2022/0375013 A1* | 11/2022 | Chijik | G06Q 50/184 |

OTHER PUBLICATIONS

"Frequently Asked Questions About the California Cannabis Track-and-Trace System". Retrieved from <https://static.cdfa.ca.gov/MCCP/document/CCTT_FAQ_5.8.19.pdf>. May 2019. (Year: 2019).*

Hoffman et al. "Massachusetts Seed-to-Sale Guidance". Retrieved from <https://masscannabiscontrol.com/wp-content/uploads/2021/05/20210517_Guidance_Seed-to-Sale.pdf>. May 2021. (Year: 2021).*

* cited by examiner

CANNABIS TRACKING ASSEMBLY

CROSS-REFERENCE TO RELATED APPLICATIONS

I hereby claim the benefit under 35 U.S.C., Section 120 of U.S. application Ser. No. 17/109,609 filed Dec 2, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tracking devices and more particularly pertains to a new tracking device for tracking the progress of cannabis products through a retail chain.

(2) Description of Related Art including information disclosed under 37 CFR 1.97 and 1.98

The prior art relates to tracking devices including a variety of bar code scanning devices that are employed in a retail environment for tracking inventory. Additionally, the prior art discloses a variety mobile point of sale apparatuses. The prior discloses a method of managing chain of custody of cannabis products.

BRIEF SUMMARY OF THE INVENTION

An embodiment of the disclosure meets the needs presented above by generally comprising a tracking unit that can be manipulated by a user in a cannabis retail environment. The tracking unit is actuatable to scan identifying data from cannabis products received from a manufacturer and cannabis products sold to customers. In this way the tracking unit can track the cannabis products throughout the retail distribution chain. Additionally, the tracking unit has point of sale capabilities to process payments received from retail customers of the cannabis products. The tracking unit is in remote communication with a remote data storage device to transfer data to and from the remote data storage device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
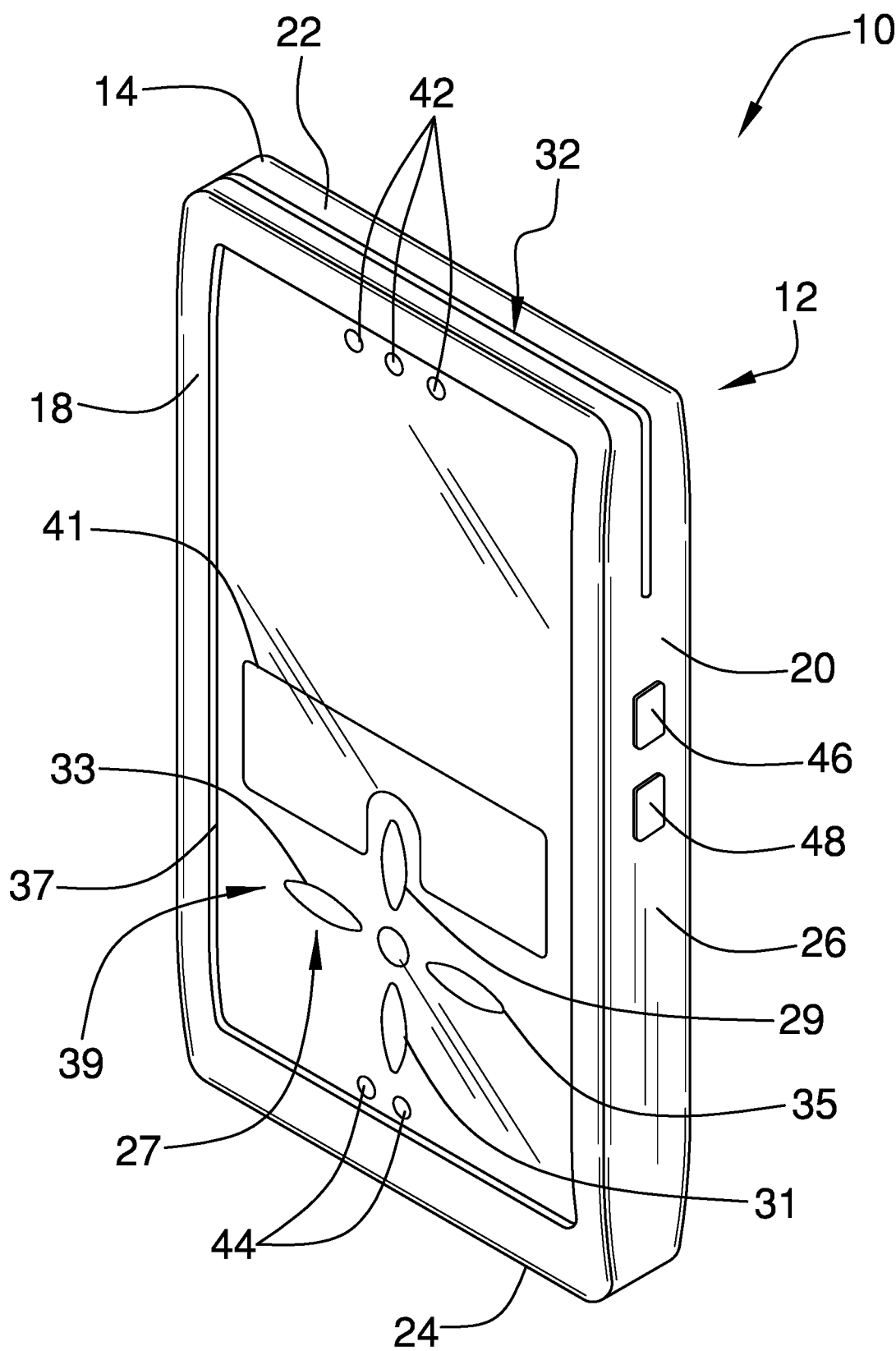
FIG. 1 is a front perspective view of a cannabis tracking assembly according to an embodiment of the disclosure.
Figure 2:
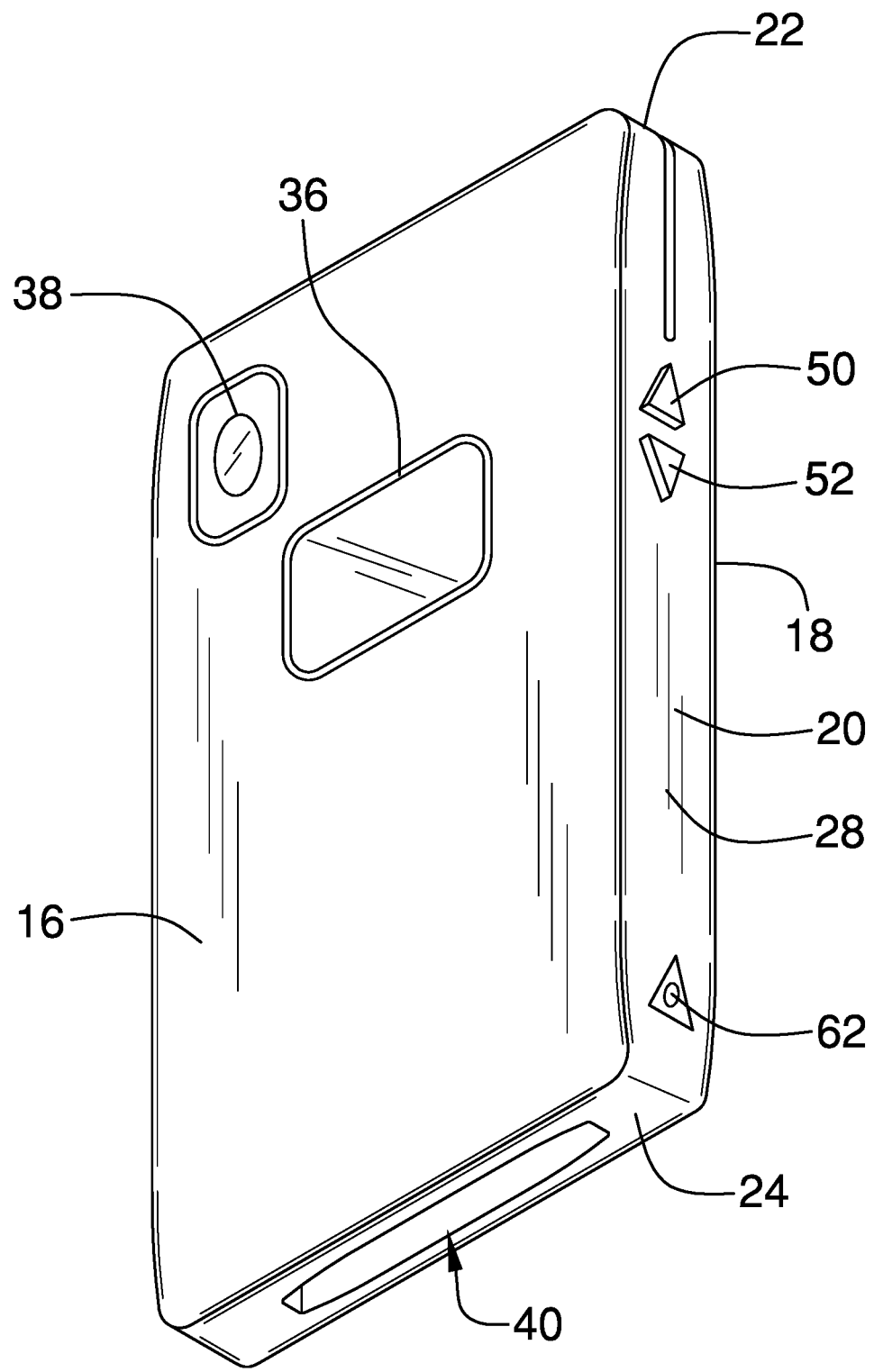
FIG. 2 is a back perspective view of an embodiment of the disclosure.
Figure 3:
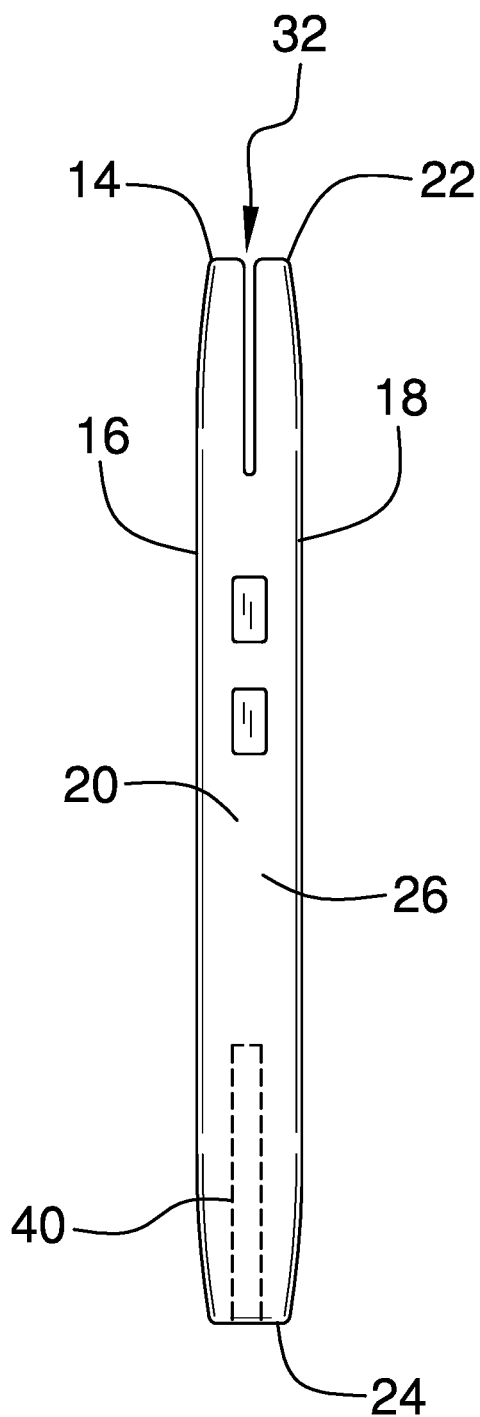
FIG. 3 is a right side phantom view of an embodiment of the disclosure.
Figure 4:
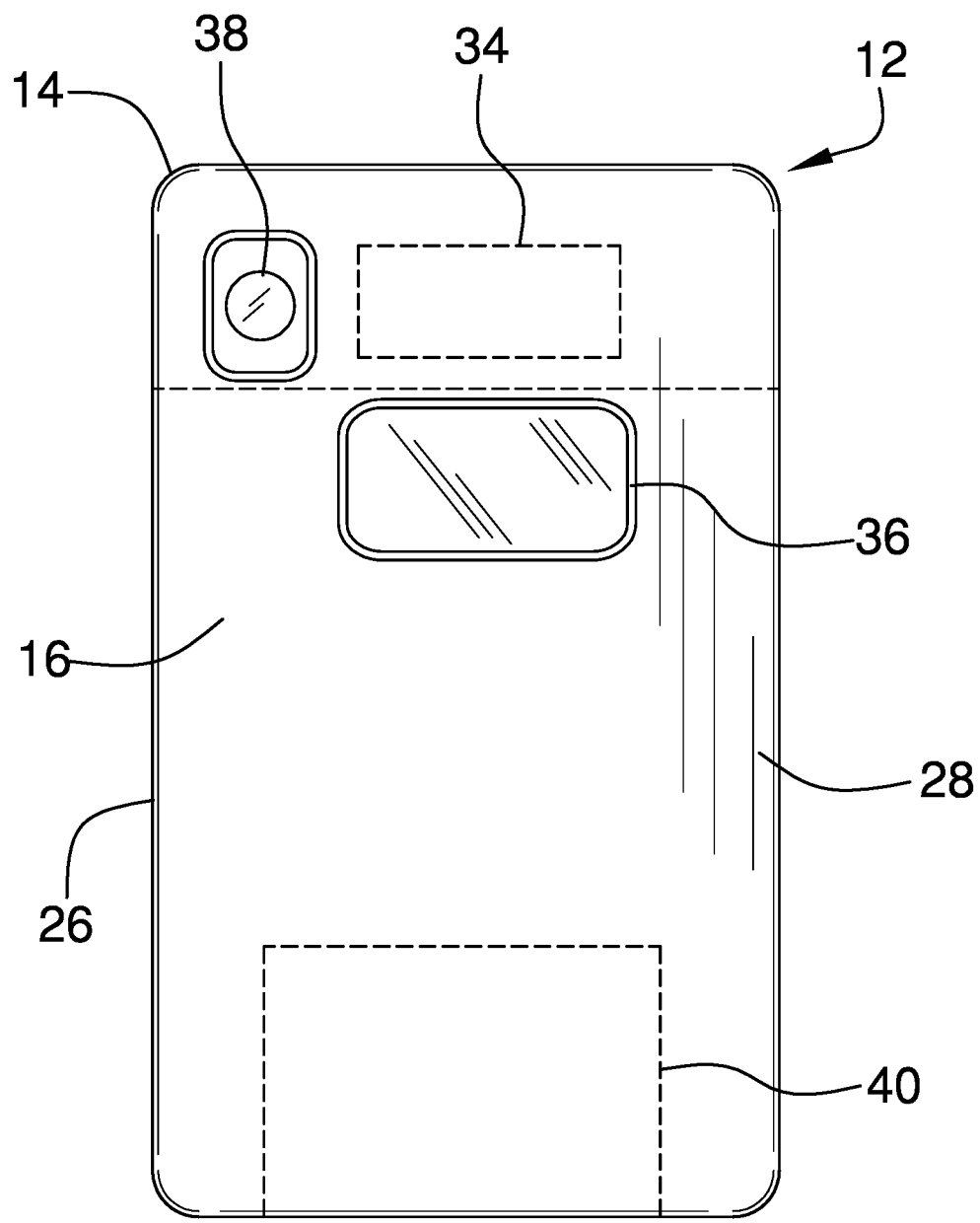
FIG. 4 is a back phantom view of an embodiment of the disclosure.
Figure 5:
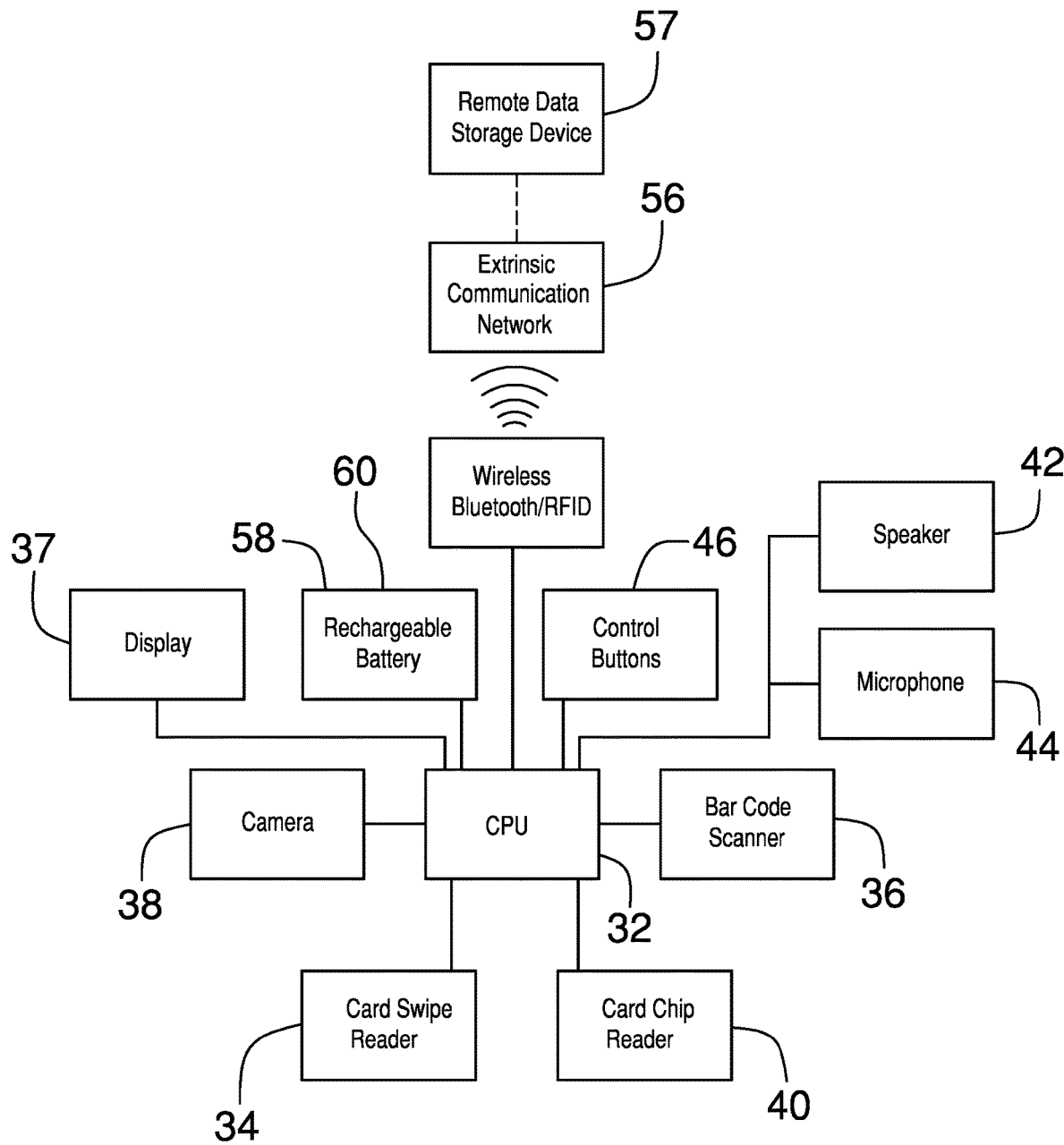
FIG. 5 is a schematic view of an embodiment of the disclosure.

With reference now to the drawings, and in particular to FIGS. 1 through 6 thereof, a new tracking device embodying the principles and concepts of an embodiment of the disclosure and generally designated by the reference numeral 10 will be described.

As best illustrated in FIGS. 1 through 6, the cannabis tracking assembly 10 generally comprises a tracking unit 12 that is manipulated by a user in a cannabis retail environment. The tracking unit 12 is actuatable to scan identifying data from cannabis products received from a manufacturer and cannabis products sold to customers. In this way the tracking unit 12 can track the cannabis products throughout the retail distribution chain. The tracking unit 12 has point of sale capabilities to process payments received from retail customers of the cannabis products. The user may be an employee of a cannabis dispensary or other person that is directly involved in the legal sale of cannabis products.

The tracking unit 12 comprises a housing 14 that has a front wall 16, a back wall 18 and a perimeter wall 20 extending therebetween. The perimeter wall 20 has a top side 22, a bottom side 24, a first lateral side 26 and a second lateral side 28. The top side 22 has a credit card slot 30 extending downwardly therein to slidably receive a credit card for processing a payment from the credit card. Additionally, the credit card slot 30 extends through the first lateral side 26 and the second lateral side 28.

A control circuit 32 is positioned in the housing 14 and a card reader 34 is integrated into the credit card slot 30 to read data from the credit card. The card reader 34 is electrically coupled to the control circuit 32 and the card reader 34 may be an electronic card reader of any conventional design. A bar code scanner 36 is coupled to the housing 14 to read a bar code on cannabis products and the bar code scanner 36 is electrically coupled to the control circuit 32. The bar code scanner 36 may comprise an infra-red bar code scanner, a QR code scanner or any other type of electronic scanner that can read bar codes. A display 37 may be coupled to the housing 14 and the display 37 may be electrically coupled to the control circuit 32. The display 37 may display indicia 39 and the display 37 may be a touch screen display or other similar electronic display. As is most clearly seen in FIG. 1, the indicia 39 may include a plurality of direction buttons 27 being arranged to radiate around a central circle. The direction buttons 27 can be manipulated to navigate data that is being displayed on the display 37, and the plurality of direction buttons 27 may include an up button 29, a down button 31, a left button 33 and a right button 35. Alternatively, the direction buttons 27 may be physical control buttons that can be depressed for use. The indicia 39 may additionally include a virtual Qwerty keyboard 41.

A camera 38 is coupled to the housing 14 to capture images and the camera 38 is electrically coupled to the control circuit 32. The camera 38 may comprise a digital camera or the like and the control circuit 32 may store facial recognition software. The tracking unit 12 may be unlocked when the camera 38 recognizes the face of an authorized user. Additionally, the tracking unit 12 may include pass code security functions, biometric security functions or other common security functions employed on electronic devices. A card chip reader 40 is recessed into the bottom side 24 of the perimeter wall 20 of the housing 14. The card chip reader 40 reads a microchip integrated into a credit card when the credit card is inserted into the card chip reader 40. The card chip reader 40 is electrically coupled to the control circuit 32 and the card chip reader 40 may comprise an electronic chip reader of any conventional design.

A speaker 42 is coupled to the housing 14 to emit audible sound outwardly therefrom. The speaker 42 is electrically coupled to the control circuit 32 and the speaker 42 may comprise an electronic speaker of any conventional design. A microphone 44 is coupled to the housing 14 to detect audible sound and the microphone 44 is electrically coupled to the control circuit 32. The microphone 44 may comprise an electronic microphone of any conventional design.

A power button 46 is movably coupled to the housing 14, the power button 46 is electrically coupled to the control circuit 32 and the power button 46 turns the control circuit 32 on and off. A scanner button 48 is movably coupled to the housing 14, the scanner button 48 is electrically coupled to the control circuit 32 and the scanner button 48 actuates the bar code scanner 36 when the scanner button 48 is depressed. A volume up button 50 is movably coupled to the housing 14, the volume up button 50 is electrically coupled to the control circuit 32 and the volume up button 50 increases the volume of the speaker 42 toward a maximum volume when the volume up button 50 is depressed. A volume down button 52 is movably coupled to the housing 14, the volume down button 52 is electrically coupled to the control circuit 32 and the volume down button 52 decreases the volume of the speaker 42 toward a minimum volume when the volume down button 52 is depressed.

Figure 6:
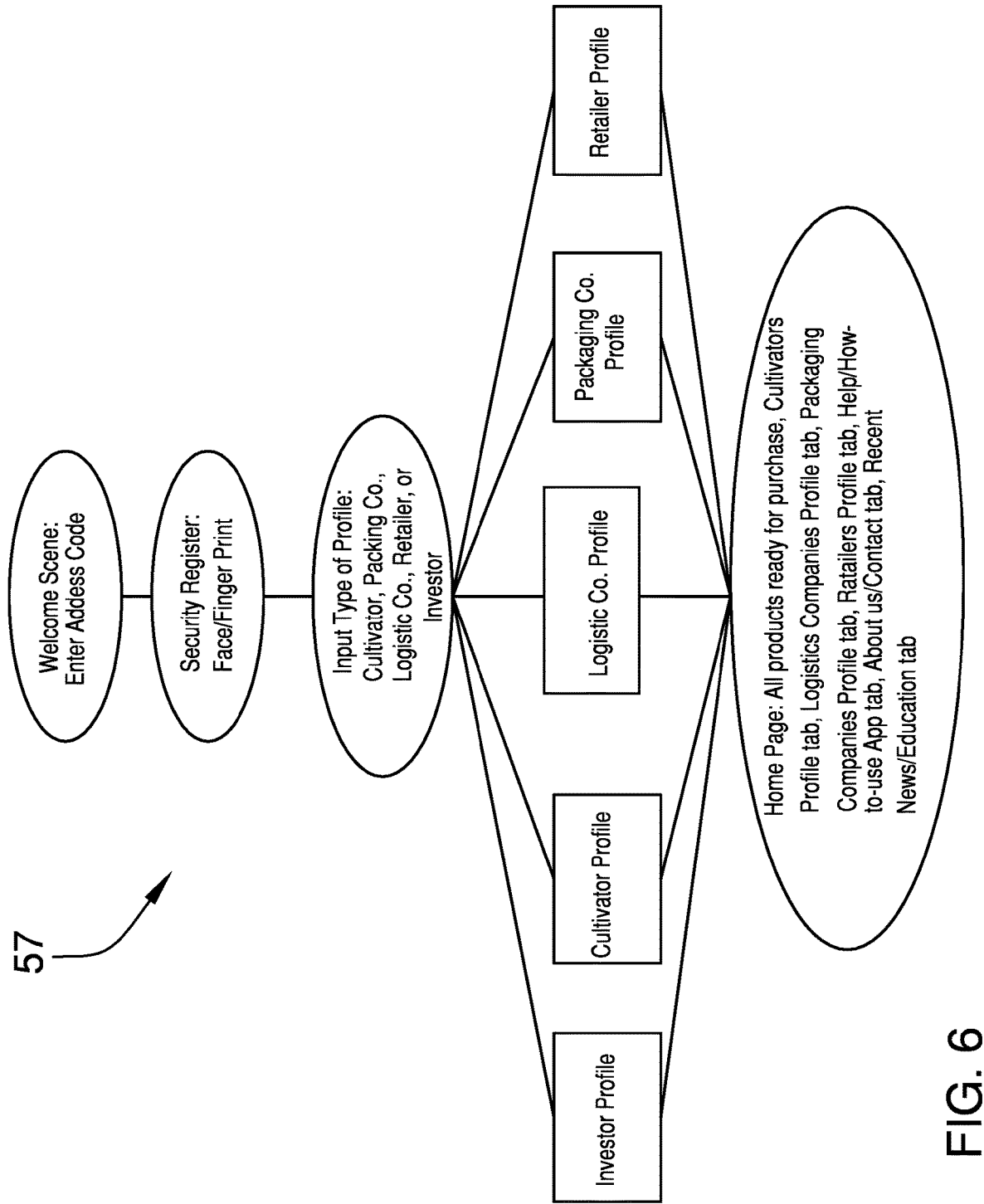
FIG. 6 is a flow chart view of a database of an embodiment of the disclosure.

A transceiver 54 is positioned in the housing 14 and the transceiver 54 is electrically coupled to the control circuit 32. The transceiver 54 is in wireless communication with an extrinsic communication network 56. The transceiver 54 may be a radio frequency transceiver or the like and the transceiver 54 may employ a WPAN signal. The extrinsic communication network 56 may comprise the internet, a cellular phone network or any other type of wireless communication network. A remote data storage device 57 is included and the remote data storage device 57 is in communication with the tracking unit 12. As is most clearly shown in FIG. 6, the remote data storage device 57 stores a database that includes investor data, cultivator data, logistics data, packing data and retail data. Additionally, the remote data storage device 57 is in wireless communication with the extrinsic communication network thereby facilitating the transceiver 54 to transfer data to and from the remote data storage device 57. The remote data storage device 54 may comprise a cloud server or other similar type of data storage that is internet accessible. FIG. 6 additionally displays a possible operational tree showing steps of accessing the database and completing tracking and point of sale operations.

A power supply 58 is integrated into the housing 14 and the power supply 58 is electrically coupled to the control circuit 32. The power supply 58 comprises at least one battery 60 that is positioned in the housing 14. The at least one battery 60 is electrically coupled to the control circuit 32. The power supply 58 includes a charge port 62 that is recessed into the housing 14. The charge port 62 is electrically coupled to the at least one battery 60. The charge port 62 insertably receives a charge cord from a power source for charging the at least one battery 60.

In use, the tracking unit 12 is manipulated to record shipments of cannabis products have been produced by a cannabis grower or manufacturer. The shipments may be shipments received at a retail dispensary or the shipments may be shipments outgoing from the manufacturer. Additionally, payment for the cannabis products can be accomplished with either the card reader 34 or the chip reader 40. The bar code scanner 36 can be actuated to read a bar code on the cannabis product to track the progress of the cannabis product through the retail chain. In this way the quantity of cannabis product received and sold by a dispensary, for example, can be accurately tracked for reporting and regulatory purposes. Additionally, the payment for the retail sale of the cannabis products can be accomplished as well as facilitating the payment to be assigned to specific cannabis products. In this wall all aspects of the production and sale of cannabis products can be tracked. The transceiver 54 facilitates the tracking unit 12 to upload data and download data from the remote storage device 57. In this wall all transactions performed with the tracking unit 12 can be reconciled with the appropriate database stored in the remote storage device 57.

Logistic Company—Logistic companies will be able to add money/transfer money to other accounts, able to see their transaction history, able to view their Gross profit, able to view their messages. Pricing, location, response radius, fleet inventory/capabilities, reviews/ratings, company bio, product information, and if they have cultivation, packaging, and retailer capabilities these would be viewable by all Green Gold users.

Packaging Companies—Packaging companies will add money/transfer money to other accounts, able to see their transaction history, able to view their Gross profit, able to view their messages. Packaging options, pricing, location, reviews/ratings, company bio, product information, and if they have logistic, cultivation, and retailer capabilities these would be viewable by all Green Gold users. If an investor has secured some type of business license like a LLC, they will be able to customize their order with their own designs and logos. In this circumstance the investor will be given a customer number and will have to contact the packaging company on their website/email to submit their images.

Investors would be able to choose how they want their products packaged with the packaging company and delivered to the retailer. They would have the option of lg pre-rolls up to 1 lb containers. (container options lg pre-roll, 3.5 g, 7 g, 14 g, 28 g, 112 g, 224 g, 448 g)

Retailers—(The goal is for individual people to be able to register the Burner and home address or business address as a retailer and receive packages cannabis to their address for a sale using the Green Gold Burner to track every sale made.)—Retailers will add money/transfer money to other accounts, able to see their transaction history, able to view their Gross profit, able to view their message, security company they are using, location, weekly total transactions, reviews/ratings, company bio, product information, and if they have logistic, packaging, and cultivation capabilities would be viewable by all Green Gold users.

The investor will pay upfront, but the money will be held until certain bench marks are made giving the investor protection. If orders are not complete funds would be returned to the investor. The logistic companies will be responsible for weighing product before leaving the farmer. Farmers will need to have the product in the pre-coded Green Gold bags upon arrival of logistic company. The logistic company will weigh the load and scan each bag using their Burner. Once the logistic company has marked the load as complete the funds paid by the investor to the farmer will be release to the farmer and ½ the pay will be release to the logistic company.

Once the logistic company arrives at the packaging company, it is the packaging company responsibility to weigh and scan the order for completion. When the packaging company acknowledges they have received the complete order the second ½ of the logistic company's payment will be release to them and the packaging company will have ⅓ of their payment release to them.

Packaging companies will receive bar codes for every container of cannabis and for the boxes thee containers will go in for pick up. Once the logistic company has scanned the boxes they are supposed pick up and marked as complete, ½ of their payment will be released and the second ⅓ payment to the packaging company will be released.

Once the retailer has receive the load weighed, and scanned for complete the second ½ of the logistic company's payment will be released to them and the ⅓ of the packaging company's payment will be released to the packaging company.

Retailers would not be able to sell products cheaper or less than certain price minimum to ensure the investors a return on their investment.

Key Features: Investors being able to give cannabis to Retailers on consignment or COD, Payments to Investors from Retailers, Profiles, Check and Balance System, Retailer price minimums Payments/Payouts All payments and payouts will be done on the Green Gold app using the Burner's card swipe or chip reader. When an investor needs to pay for product, logistics, or packaging they will be able to insert or swipe their card using the Burner to pay. When retailers have to pay the investors their portion of the profits they will be able to use their Burner's card swipe, chip reader or the money currently on their Green Gold account. Cultivators, logistic companies, packaging companies, retailers, and investor will start gaining money on the Green Gold app, they will be able to transfer this money to other Green Gold users. Example; an investor's first time buying product will have to use their debit/credit card to purchase product, pay for logistics, and packaging.

1. Investor buy a product for $800 using their debit/credit card by inserting or swiping the card.

2. Investor pays $200 for logistics using their debit/credit card by inserting or swiping the card.

3. Investor pays $100 for packaging using their debit/credit card by inserting or swiping the card.

4. Investor and a retailer will come to an agreement on either paying the investor COD or on consignment.

Green Gold profile/account. The Investor can use that $2000 to buy more product, pay for logistics, and package. Or they could insert or swipe a debit card and transfer the $2000 to that card. Retailers will determine the price that fits best for their market, but there is a minimum price that retailers can sell. This way it ensures investors and retailers receive their appropriate profit. 6. Cultivators, Logistic Companies, Packaging Companies, Retailers will all have the same capabilities as an Investor. Investors will not have the same capabilities as Cultivators, Logistic Companies, Packaging Companies, and Retailers.

Profiles

Investor profile—This is where the investor will add money/transfer money to other accounts. Individuals Green Gold Burner users will be able to see their transaction history, be able to view their Gross and Net profit, and be able see where their products are and how well it is selling. Their message inbox is also on their profile page. The only thing that would be viewable by other Green Gold users would be their user name and the total amount of product in pounds of cannabis purchased.

Cultivator profile—This is where they will add money/transfer money to other accounts. Cultivators will be able to see their transaction history, will be able to view their Gross profit, view their messages, location, reviews/ratings, company bio, product information, and if they have logistic, packaging, and if retailer capabilities are available these would be viewable by all Green Gold users. Once the cultivator has completed all regulation (all proper licenses and permits to cultivate) and been accepted as a Green Gold cultivator, they will need to order Green Gold precoded bags for their harvest. Bags will be available in 1 lb, 5 lb, and 10 lb size. These bags will be made out of recycled materials, hopefully from the cannabis industry. The bags will make it easy for the logistic companies to scan and weight upon pickup. Green Gold will use companies like Metric and Viridian Science to track and trace all the cannabis that has been tested and compliant according to government standards With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cannabis tracking assembly for tracking the sales and purchase of cannabis products, said assembly comprising:
   a tracking unit being configured to be manipulated by a user in a cannabis retail environment, said tracking unit being actuatable to scan identifying data from cannabis products received from a manufacturer and cannabis products sold to customers wherein said tracking unit is configured to track the cannabis products throughout the retail distribution chain, said tracking unit having point of sale capabilities wherein said tracking unit is configured to process payments received from retail customers of the cannabis products, wherein said tracking unit comprises
      a housing having a front wall, a back wall and a perimeter wall extending therebetween, said perimeter wall having a top side, a bottom side, a first lateral side and a second lateral side, said top side having a credit card slot extending downwardly therein wherein said credit card slot is configured to slidably receive a credit card for processing a payment from the credit card, said credit card slot extending through said first lateral side and said second lateral side,
      a control circuit positioned in said housing, and
      a display coupled to said housing, said display being electrically coupled to said control circuit, said display displaying indicia including a keyboard, a notch extending into a bottom edge of said keyboard, said indicia including directional buttons, said directional buttons including a central button and a plurality of outwardly radiating buttons, one of said outwardly radiating buttons extending into said notch; and
   a remote data storage device, said remote data storage device being in communication with said tracking unit, said remote data storage device storing a database comprising investor data, cultivator data, logistics data, packing data and retail data, said remote data storage device being in wireless communication with an extrinsic communication network.

2. The assembly according to claim 1, wherein said tracking unit includes a card reader being integrated into said credit card slot wherein said card reader is configured to read data from the credit card, said card reader being electrically coupled to said control circuit.

3. The assembly according to claim 1, further comprising a bar code scanner being coupled to said housing wherein said bar code scanner is configured to read a bar code on cannabis products, said bar code scanner being electrically coupled to said control circuit.

4. The assembly according to claim 1, wherein said tracking unit includes a camera being coupled to said housing wherein said camera is configured to capture images, said camera being electrically coupled to said control circuit.

5. The assembly according to claim 1, wherein said tracking unit includes a card chip reader being recessed into said bottom side of said perimeter wall of said housing wherein said card chip reader is configured to read a microchip integrated into a credit card, said card chip reader being electrically coupled to said control circuit.

6. The assembly according to claim 1, wherein said tracking unit includes a speaker being coupled to said housing wherein said speaker is configured to emit audible sound outwardly therefrom, said speaker being electrically coupled to said control circuit.

7. The assembly according to claim 1, wherein said tracking unit includes a microphone being coupled to said housing wherein said microphone is configured to detect audible sound, said microphone being electrically coupled to said control circuit.

8. The assembly according to claim 1, wherein said tracking unit includes a power button being movably coupled to said housing, said power button being electrically coupled to said control circuit, said power button turning said control circuit on and off.

9. The assembly according to claim 3, wherein said tracking unit includes a scanner button being movably coupled to said housing, said scanner button being electrically coupled to said control circuit, said scanner button actuating said bar code scanner when said scanner button is depressed.

10. The assembly according to claim 6, wherein said tracking unit includes:
    a volume up button being movably coupled to said housing, said volume up button being electrically coupled to said control circuit, said volume up button increasing the volume of said speaker toward a maximum volume when said volume up button is depressed; and
    a volume down button being movably coupled to said housing, said volume down button being electrically coupled to said control circuit, said volume down button decreasing the volume of said speaker toward a minimum volume when said volume down button is depressed.

11. The assembly according to claim 1, wherein said tracking unit includes a transceiver being positioned in said housing, said transceiver being electrically coupled to said control circuit, said transceiver being in wireless communication with the extrinsic communication network.

12. The assembly according to claim 1, wherein said tracking unit includes a power supply being integrated into said housing, said power supply being electrically coupled to said control circuit, said power supply comprising:
    at least one battery being positioned in said housing, said at least one battery being electrically coupled to said control circuit; and
    a charge port being recessed into said housing, said charge port being electrically coupled to said at least one battery, said charge port insertably receiving a charge cord from a power source fir charging said at least one battery.

13. A cannabis tracking assembly for tracking the sales and purchase of cannabis products, said assembly comprising:
    a tracking unit being configured to be manipulated by a user in a cannabis retail environment, said tracking unit being actuatable to scan identifying data from cannabis products received from a manufacturer and cannabis products sold to customers wherein said tracking unit is configured to track the cannabis products throughout the retail distribution chain, said tracking unit having point of sale capabilities wherein said tracking unit is configured to process payments received from retail customers of the cannabis products, said tracking unit comprising:
        a housing having a front wall, a back wall and a perimeter wall extending therebetween, said perimeter wall having a top side, a bottom side, a first lateral side and a second lateral side, said top side having a credit card slot extending downwardly therein wherein said credit card slot is configured to slidably receive a credit card for processing a payment from the credit card, said credit card slot extending through said first lateral side and said second lateral side;

a control circuit being positioned in said housing;

a display coupled to said housing, said display being electrically coupled to said control circuit, said display displaying indicia including a keyboard, a notch extending into a bottom edge of said keyboard, said indicia including directional buttons, said directional buttons including a central button and a plurality of outwardly radiating buttons, one of said outwardly radiating buttons extending into said notch;

a card reader being integrated into said credit card slot wherein said card reader is configured to read data from the credit card, said card reader being electrically coupled to said control circuit;

a bar code scanner being coupled to said housing wherein said bar code scanner is configured to read a bar code on cannabis products, said bar code scanner being electrically coupled to said control circuit;

a camera being coupled to said housing wherein said camera is configured. to capture images, said camera being electrically coupled to said control circuit;

a card chip reader being recessed into said bottom side of said perimeter wall of said housing wherein said card chip reader is configured to read a microchip integrated into a credit card, said card chip reader being electrically coupled to said control circuit;

a speaker being coupled to said housing wherein said speaker is configured to emit audible sound outwardly therefrom, said speaker being electrically coupled to said control circuit;

a microphone being coupled to said housing wherein said microphone is configured to detect audible sound, said microphone being electrically coupled to said control circuit;

a power button being movably coupled to said housing, said power button being electrically coupled to said control circuit, said power button turning said control circuit on and off;

a scanner button being movably coupled to said housing, said scanner button being electrically coupled to said control circuit, said scanner button actuating said bar code scanner when said scanner button is depressed;

a volume up button being movably coupled to said housing, said volume up button being electrically coupled to said control circuit, said volume up button increasing the volume of said speaker toward a maximum volume when said volume up button is depressed;

a volume down button being movably coupled to said housing, said volume down button being electrically coupled to said control circuit, said volume down button decreasing the volume of said speaker toward a minimum volume when said volume down button is depressed;

a transceiver being positioned in said housing, said transceiver being electrically coupled to said control circuit, said transceiver being in wireless communication with an extrinsic communication network;

a power supply being integrated into said housing, said power supply being electrically coupled to said control circuit, said power supply comprising:
  at least one battery being positioned in said housing, said at least one battery being electrically coupled to said control circuit; and
  a charge port being recessed into said housing, said charge port being electrically coupled to said at least one battery, said charge port insertably receiving a charge cord from a power source for charging said at least one battery; and
a remote data storage device, said remote data storage device being in communication with said tracking unit, said remote data storage device storing a database comprising investor data, cultivator data, logistics data, packing data and retail data, said remote data storage device being in wireless communication with the extrinsic communication network thereby facilitating said transceiver to transfer data to and from said remote data storage device.

* * * * *